United States Patent [19]
Lenz et al.

[11] 4,316,631
[45] Feb. 23, 1982

[54] BACKREST

[75] Inventors: Wolfgang Lenz; Johann Albenberger; Karl Knell, all of Steyr, Austria

[73] Assignee: Steyr-Daimler-Puch Aktiengesellschaft, Vienna, Austria

[21] Appl. No.: 100,726

[22] Filed: Dec. 6, 1979

[30] Foreign Application Priority Data

Jan. 24, 1979 [AT] Austria ............................ 490/79

[51] Int. Cl.$^3$ ............................................. A47C 7/46
[52] U.S. Cl. .................................... 297/284; 297/460
[58] Field of Search ............... 297/284, 230, 231, 460; 267/89

[56] References Cited

U.S. PATENT DOCUMENTS

| | | | |
|---|---|---|---|
| 2,756,809 | 7/1956 | Endresen | 297/284 |
| 2,843,195 | 7/1958 | Barvaeus | 297/284 |
| 2,942,651 | 6/1960 | Binding | 297/284 |
| 3,378,299 | 4/1968 | Sandor | 297/284 |
| 3,724,144 | 4/1973 | Schuster | 297/284 |
| 3,762,769 | 10/1973 | Poschl | 297/284 |
| 4,153,293 | 5/1979 | Sheldon | 297/284 |
| 4,156,544 | 5/1979 | Swenson et al. | 297/284 |

FOREIGN PATENT DOCUMENTS 2804703  8/1979  Fed. Rep. of Germany ...... 297/284

Primary Examiner—Francis K. Zugel
Attorney, Agent, or Firm—Kurt Kelman

[57] ABSTRACT

A curved backing insert is held in a backrest frame and adjustable to conform to the spine of a person leaning against the backrest. The backing insert comprises at least one elastic bow having a first end supported by said frame, a second end vertically spaced from said first end, and an intermediate vertex portion including a vertex. First stressing means are adjustable to move said second end so as to change the height and curvature of said bow. Second stressing means are adjustable to adjust said vertex relative to said first and second ends.

13 Claims, 12 Drawing Figures

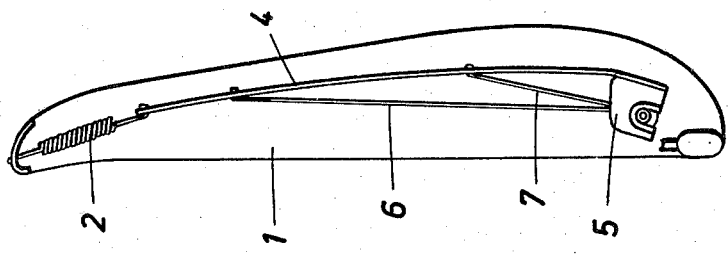
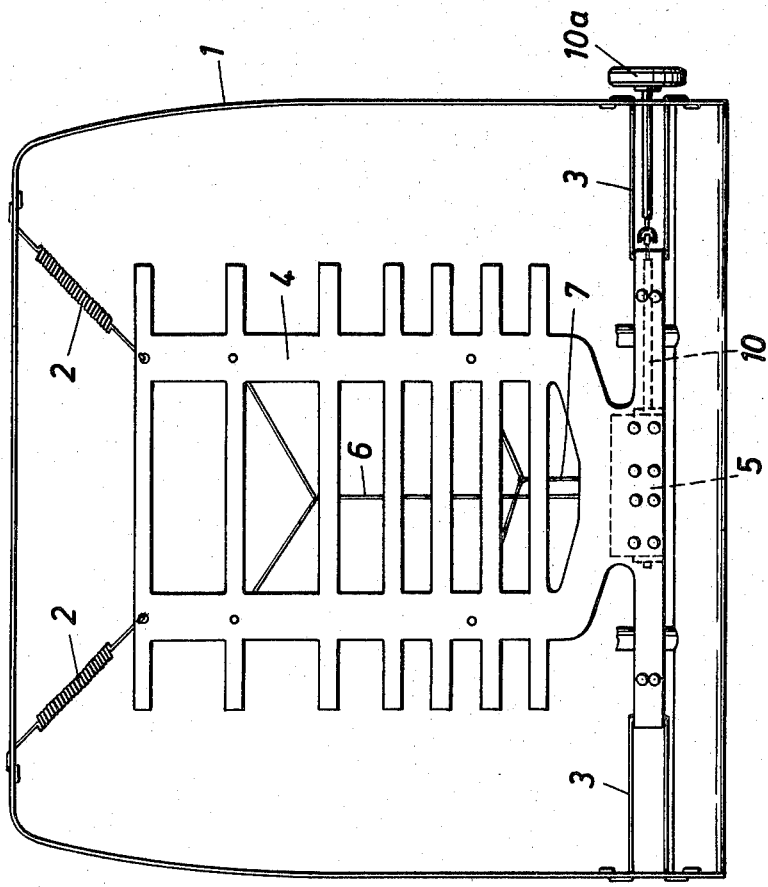

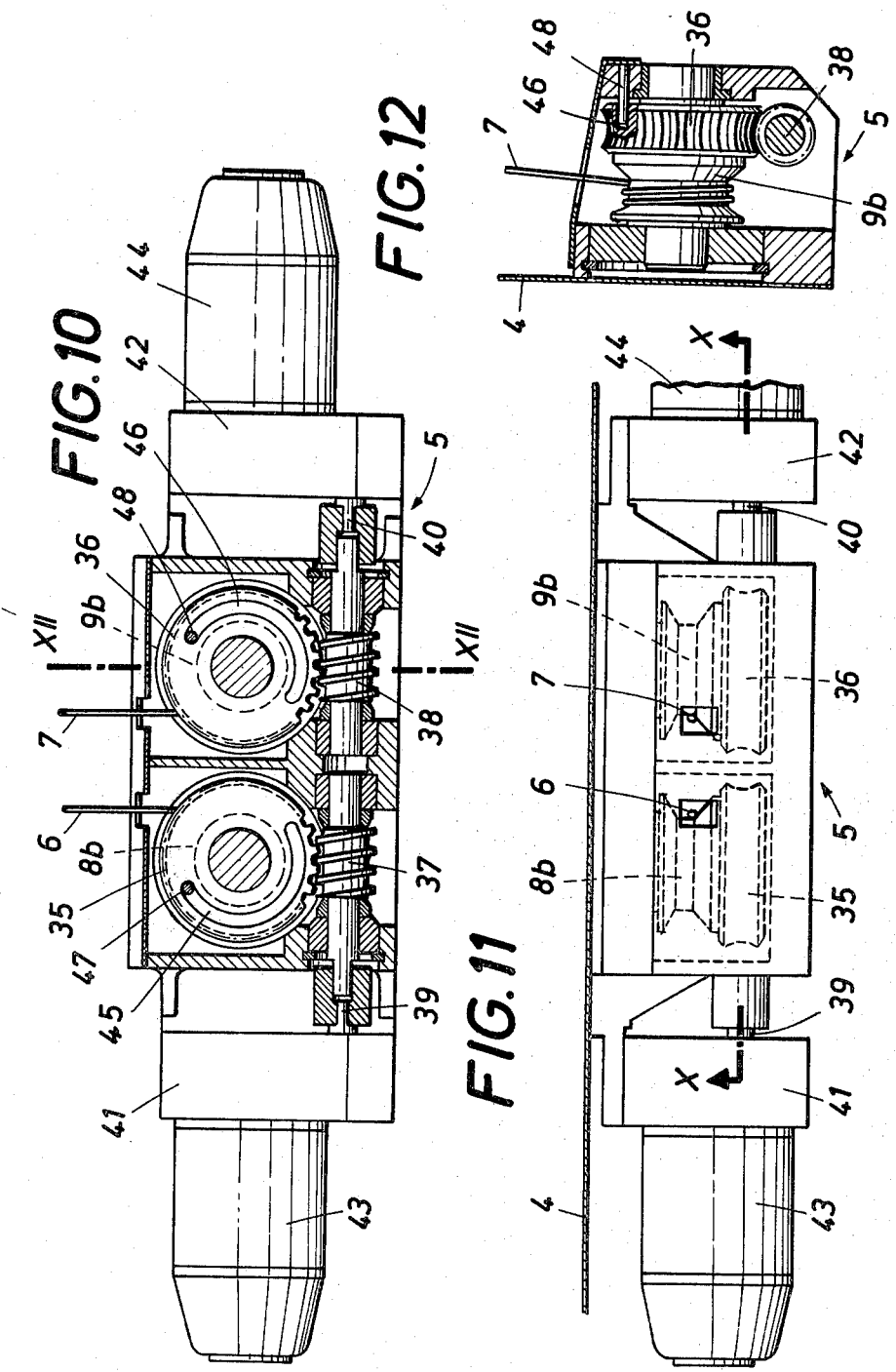

BACKREST

This invention relates to a backrest, particularly for seats in motor vehicles, comprising a curved backing insert, which is adjustable in height and as regards the position of the vertex of its curvature for adaptation to the shape of the spine.

In a known backrest of that kind, the backing insert is composed of a plurality of juxtaposed backing rods, each which comprises a plurality of sleeves, which are threaded on a tension element (Austrian Pat. No. 308,318). Some of the sleeves have end faces which are inclined to the axis of the sleeve, and are held against rotation so that as the tension elements are tensioned the wedge-shaped spaces defined by the inclined end faces are more or less closed and a curvature is thus imparted to the backing rods. That structure is relatively complicated and expensive, particularly because means for tensioning the tension elements are required. Besides, it is different to change the position of the vertex of the curvature over the surface of the seat.

It is an object of the invention to eliminate these disadvantages and to provide a backrest which is suitable for seats in vehicles and for other seats and which is simplified and less expensive in structure and facilitates the change of the vertex of the curvature over the surface of the seat for a close adaptation to spines having various shapes.

This object is accomplished according to the invention in that the backing insert comprises at least one bow, which has preferably a front surface of substantial width and is supported at one end whereas its other end is adjustable by means of at least one tension or compression element for a change of the curvature of the bow, and at least one additional tension or pressure element engages the bow adjacent to its vertex.

An adjustment of the first tension or compression element will decrease or increase the length of the chord and the radius of curvature of the bow. If the additional tension or compression element is adjusted independently from the first, the vertex of the curvature of the bow is shifted downwardly from a central position to a position which corresponds to the anatomic shape of the spine. It is sufficient to actuate the tension or compression element; this can be accomplished with simple means. The bow or bows need not be composite because materials having adequate flexibility for this purpose are available.

In a particularly desirable design, the bow is supported and, if desired, secured at its lower end to a housing, reels for winding and unwinding the tension elements are rotatably mounted in said housing and can be coupled in alternation to a drive shaft, and retaining means are provided for holding the reels in position after an adjustment. In such an arrangement a single drive means can be used to change the height of the bow and the position of the vertex of its curvature in that the drive shaft is coupled to one reel or and other. The retaining mechanism serve to hold the reels in the adjusted rotational position and to maintain the tension of the respective tension element.

It will be particularly desirable to provide the drive shaft with a coupling member, which is disposed between the reels and serves to couple the drive shaft to the selected reel and can be selectively engaged with one reel and the other by a longitudinal displacement of the drive shaft. In that case a single clutch is sufficient for both reels.

In accordance with the invention, each retaining mechanism comprises a retaining member which is axially displaceable against spring force and which positively or non-positively cooperates with the associated reel. When it is desired to rotate a reel, the axially slidable retaining member of the retaining mechanism must be disengaged. As soon as the reel has reached the desired rotational position and the axially slidable retaining member is released to respond to the spring pressure, the axially slidable retaining member snaps into the reel and positively or non-positively holds it in position. The resilient cooperation between the axially slidable retaining member of the retaining mechanism and the reel can also provide a protection against overload if the retaining mechanism is arranged to release the reel in response to peak loads.

In order to prevent an automatic unwinding of the tension element when an adjustment is desired, the reel must be coupled to the coupling member before the retaining mechanism is disabled. This is accomplished in that the total axial displacement of the coupling member consists of the displacement required to engage the clutch and of the displacement required to disable the retaining mechanism.

In order to facilitate the adjustment and the accommodation of the actuating means, another feature of the invention resides in that the bow is supported and, if desired, secured at its lower end to a housing, reels for winding and unwinding the tension elements are rotatably mounted in said housing, and each reel is adapted to be driven by a reversible and automatically de-energizable electric motor and an associated transmission and the drive unit is self-locking.

In such an arrangment the tension elements can be wound and unwound by means of the electric motors and it is sufficient to energize and de-energize the motors. The switches can be provided at any desired location which is conveniently accessible and can easily be actuated. The two drive units must be self-locking so that the bow retains its adjusted position and shape. Because the motors can be automatically de-energized, a motor will be stopped when the corresponding extreme position has been reached. Each motor is preferably de-energized in dependence on its current input so that each motor will be automatically de-energized in response to the overload which occurs when the backing insert reaches one of its extreme positions or the other and the associated reel cannot be rotated further.

In a particularly simple design, each transmission comprises a worm gear train, which has a worm gear that is directly connected to the reel and is formed with a segment-shaped slot, into which a stop extends, which is fixed to the housing. A worm gear train being inherently self-locking, as a rule, additional means for this purpose are not required. The segment-shaped slot in the worm wheel and the stop fixed to the housing cooperate to limit the rotation of the worm wheel and of the reel so that the backing insert cannot be adjusted beyond predetermined exteme positions. When an end of the segment-shaped slot has reached the stop, the worm gear is held against further rotation and the motor is automatically de-energized in response to the overload which then occurs.

In order to improve the seating comfort, the entire backing insert consisting of the bow and housing may be resiliently held in a plane.

In another advantageous design, the bow is supported at its top and is slidably guided up and down on a carrier, at least one link is pivoted at one end to the bow, at the other end to an adjusting rod, which is approximately horizontally guided, and a second adjusting rod connected to another link is provided for adjusting the tension or compression element connected to the vertex portion of the bow. In that case, the lower end of the bow is moved more or less out of the carrier, whereby the curvature of the bow is changed and compressive forces must be exerted to decrease the radius of curvature. The position of the vertex of the curvature is similarly adjusted. The adjusting rods may be shifted in a simple manner by means of screws and nuts.

The subject matter of the invention is shown by way of example on the drawings, in which FIGS. 1 and 2 are, respectively, front and side elevations showing a backrest for a vehicle seat, FIG. 3 is an axial sectional view showing the housing and reels, FIG. 4 is a transverse sectional view corresponding to FIG. 3, FIG. 5 shows modified adjusting means, FIG. 6 is a view showing partly in section a modified backrest, and FIG. 7 a vertical sectional view showing the backrest of FIG. 6 on a smaller scale.

FIG. 10 is a sectional view taken on line X—X in FIG. 11 and shows the housing and the motor drive units.

Figure 3:
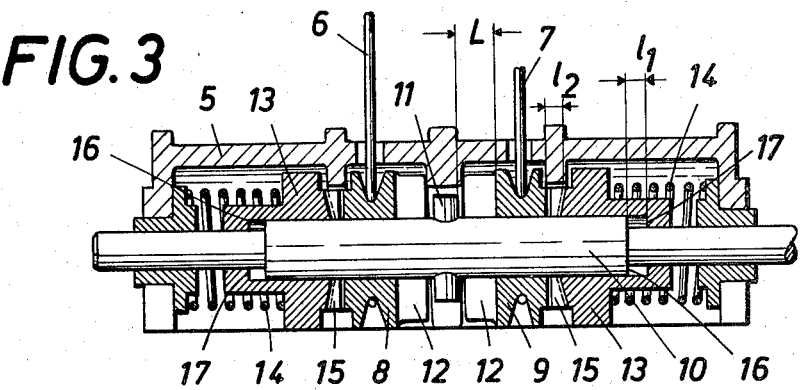
Figure 4:
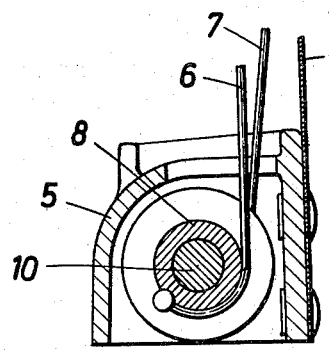

FIG. 11 a top plan view showing the drive units and

FIG. 12 a transverse sectional view taken on line XII—XII in FIG. 10.

A backing insert consisting of a bow and a housing 5 is held by means of springs 2, 3 in a frame 1. The front surface of the bow 4 has a substantial width. The bow 4 is secured at its lower end to the housing 5 and is supported by the latter. The upper end of the bow is adjustable by means of a tension element 6 for a change of the curvature of the bow. Another tension element 7 acts on the bow 4 near its vertex so that the position of the vertex of the bow can be changed.

The tension elements 6, 7 are wound on respective reels 8, 9, which are freely rotatably mounted on a drive shaft 10. The latter can be rotated by means of a handwheel 10a. A coupling member 11 is provided between the two reels 8, 9 and in accordance with FIG. 3 consists of a crosspin, which is fixed in a bore of the shaft 10. Each of the reels 8 and 9 has a diametral groove 12, which can selectively receive the pin 11. Associated with each reel is a retaining mechanism, which comprises a claw sleeve 13, which is axially slidable on the shaft and is non-rotatably held in the housing 5 and loaded by a compression spring 14. On the side remote from the pin 11, the reels 8, 9 have mating claws 15. When the reels 8, 9 are in the illustrated position, they cannot be rotated because they are retained by the claw sleeves 13. When the shaft 10 is shifted in one sense or the other so that the coupling pin 11 enters the diametral groove 12 of the reel 8 or 9, the retaining mechanism initially continues to engage the associated reel. When the shoulder 16 of the shaft 10 engages the inside annular rib 17 of the sleeve 13 is the claw sleeve 13 carried along against the force of the spring 14 and the claws 15 are released so that the respective reel 8 or 9 is then rotated and the tension element 6 or 7 is adjusted by being wound or unwound. In order to ensure that the claw sleeve 13 will retain the reel 8 or 9 in position until the coupling pin 11 has entirely engaged the diametral groove 12, the total axial displacement L of the coupling pin 11 must be at least as large as the sum of the displacement $l_1$ required for coupling the reel and the displacement $l_2$ required to disable the retaining mechanism 13, 14, 15.

Figure 5:
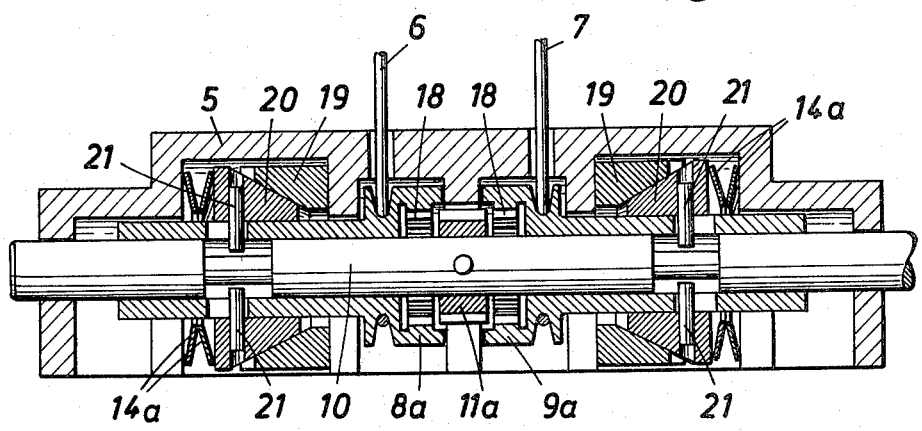
Figure 6:
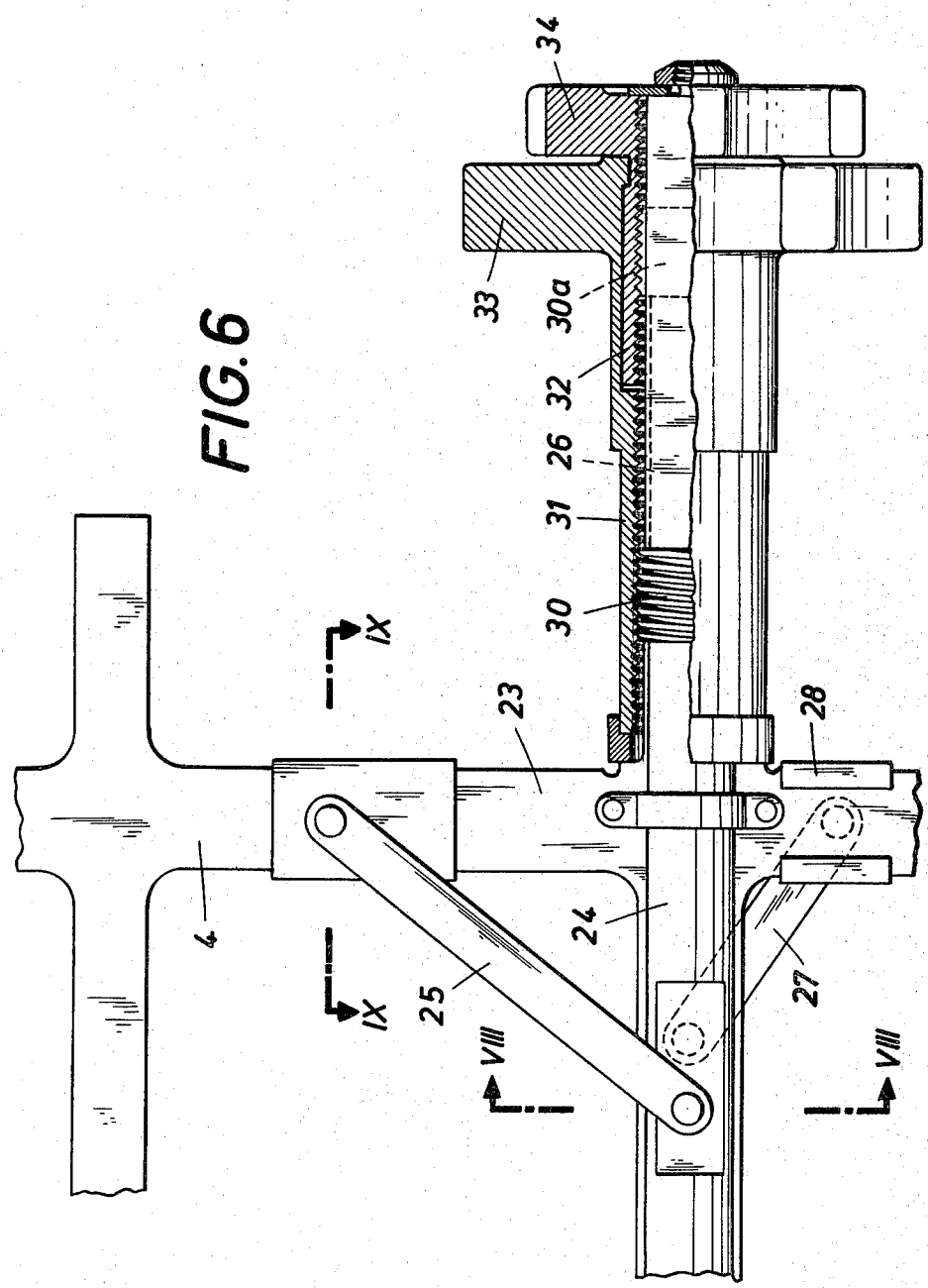
Figure 8:
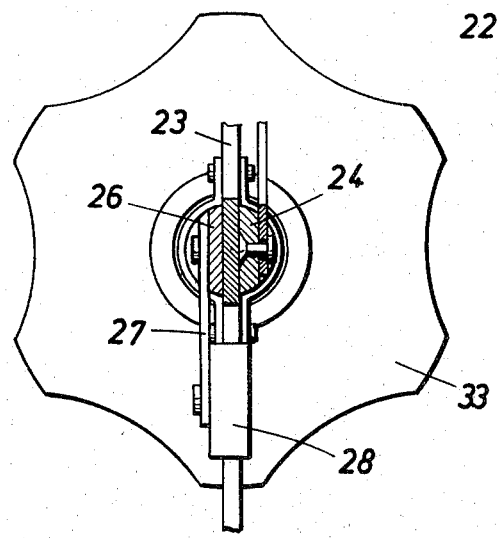
FIGS. 8 and 9 are sectional view taken on lines VIII—VIII and IX—XI of FIG. 6.
Figure 9:
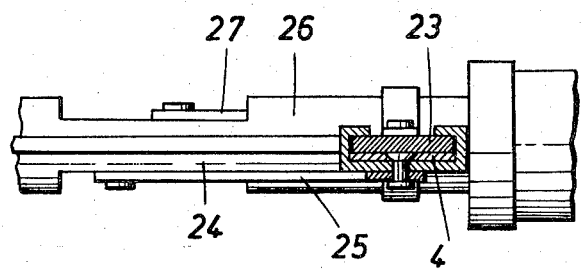
Figure 7:
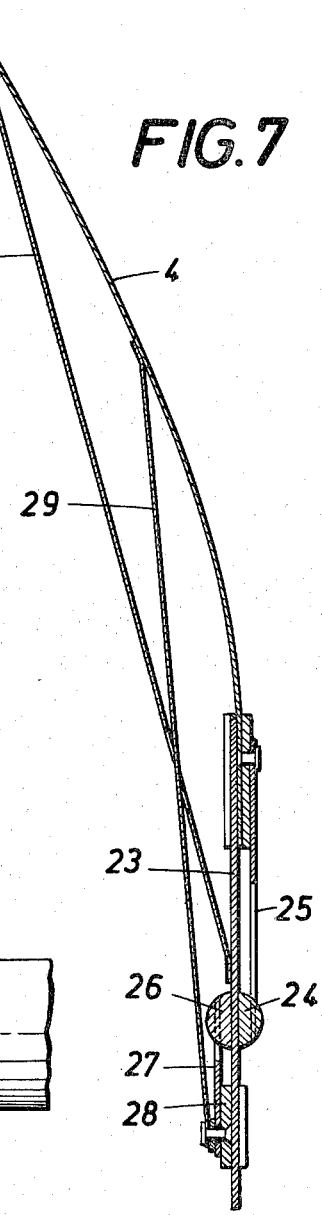

The design shown in FIG. 5 differs from the one shown in FIG. 3 in that the coupling member 11a consists of a gear and each reels 8a or 9a is provided with mating internal teeth 18. Each retaining mechanism consists of a non-positive brake. The latter consists of an internally conical member 19, which is non-rotatably held in the housing 5, and an externally conical member 20, which is non-rotatably connected to the shaft 10 and urged against the internally conical member by disc springs 14a. In response to an axial displacement of the shaft 10, the teeth of the gear 11a interengage with the internal teeth 18 of the sleeve 8a or 9a. As the displacement is continued, the pins 21 carry along the externally conical member 20 against the force of the disc springs 14a and the respective reel can be rotated without being braked.

In the embodiment shown in FIGS. 6 to 9, the bow 4 is supported at its top end by a rigid strut 22. The lower end of the bow 4 is slidably guided up and down by a carrier 23, to which the rigid strut 22 is secured. A horizontally guided adjusting rod 24, which is substantially semicircular in cross-section, is provided on the carrier 23. A strap 25 is pivoted at one end to the adjusting rod 24 and at its other end engages the lower end of the bow. A second adjusting rod 26 is slidably mounted on the other side of the carrier 23. A link 27 is pivoted at one end to the adjusting rod 26 and at the other end to a slider 28, to which a compression and tension element 29 is connected, which leads to the vertex of the bow. Each of the two adjusting rods 24, 26 is provided with a half screw thread 30 or 30a, which cooperates with a nut 31 or 32. Each nut 31 or 32 is connected to a handwheel 33 or 34. As the handwheel 33 is rotated, the adjusting rod 24 is displaced and the lower end of the bow is moved up and down by means of the link 25. A rotation of the handwheel 34 results in a displacement of the adjusting rod 26 and by means of the link 27 in an upward or downward movement of the slider 28 so that the vertex of the bow is shifted by means of the compression and tension element 29.

In the embodiment shown in FIGS. 10 to 12, the housing 5 is secured to the lower end of the bow 4, not shown in detail. The housing 5 accommodates the drive units for winding and unwinding the tension elements 6 and 7, which consist of ropes or cables. The two ropes or cables 6 and 7 are wound on respective reels 8b, 9b, which are directly connected to the worm wheels 35, 36. The worm wheels mesh with respective worms 37, 38, which are coupled with the output shaft 39, 40 of an associated transmission 41 or 42. Electric motors 43, 44 are attached to the transmissions 41, 42 respectively. The reels 8b, 9b are driven by the respective motors 43, 44 via the transmission 41 or 42 and the worm gear trains 35, 37 or 36, 38, which are self-locking.

Each worm wheel 35 or 36 has a segment-shaped slot in the form of a groove 45 or 46, which receives a stop, which is secured to the housing and consists of a pin 47 or 48. As a result, the rotation of the worm wheels is limited by the angular extent of the grooves 45, 46. When one of the stops 47 and 48 engages one end of the associated groove 45 or 46, the resulting overload on the motor 43 or 44 causes the motor to be de-energized. It will be understood that the grooves 45, 46 are dimensioned so that the bow 4 is moved by the ropes or cables 6, 7 from one extreme position to the other as a result of a rotation of the worm wheel through the angle which is defined by the grooves, and that each electric motors 43 or 44 must be reversible so that each of the ropes or cables 6, 7 can be wound and unwound as is required to move the bow 4 to both extreme positions.

What is claimed is:

1. A backrest comprising
   (a) a backrest frame,
   (b) a housing fixedly mounted on the frame,
   (c) a curved backing insert held in the backrest frame and adjustable to conform to the spine of a person leaning against the backrest, the insert comprising an elastic bow having a lower end fixedly supported in the housing, a second end vertically spaced from the lower end and an intermediate vertex portion defining a vertex,
   (d) a first stressing means comprising a first reel rotatably mounted in the housing and a first flexible tension element having respective ends connected to the first reel and to the second end, the tension element defining a chord of the curved backing insert and being adapted to be wound on, and unwound from, the first reel for moving the second end relative to the lower end so as to change the curvature of the backing insert,
   (e) a second stressing means comprising a second reel rotatably mounted in the housing and a second flexible tension element having respective ends connected to the second reel and to the vertex portion, the second tension element defining a chord of the curved backing insert and being adapted to be wound on, and unwound from, the second reel for moving the vertex portion relative to the lower and second ends,
   (f) a drive shaft rotatably mounted in the housing,
   (g) clutch means mounted in the housing and operable for selective coupling of the first and second reels to the drive shaft,
   (h) first retaining means adapted to cooperate releasably with the first reel to hold the first stressing means in an adjusted position, and
   (i) second retaining means adapted to cooperate releasably with the second reel to hold the second stressing means in an adjusted position, the adjusted positions of the first and second stressing means maintaining the curved backing insert conformed to the spine of the person leaning thereagainst.

2. A backrest as set forth in claim 1, in which said first and second reels are rotatably mounted on said drive shaft and axially spaced apart and said clutch means comprise a coupling member disposed between said first and second reels and non-rotatably connected to said drive shaft and movable along said drive shaft into selective engagement with each of said first and second reels to couple said reel to said drive shaft.

3. A backrest as set forth in claim 2, in which said drive shaft is axially movable in said housing and said coupling member is axially movable with said drive shaft into selective engagement with each of said first and second reels.

4. A backrest as set forth in claim 2, in which each of said first and second retaining means comprises
   a retaining member which is movable along said shaft into engagement with the associated reel to hold the same against rotation, and
   spring means urging said retaining member toward said associated reel.

5. A backrest as set forth in claim 4, in which each of said springs is adapted to hold the associated retaining member in non-positive engagement with the associated reel.

6. A backrest as set forth in claim 4, in which each of said retaining members is movable into positive engagement with the associated reel.

7. A backrest as set forth in claim 4, in which
   said drive shaft is axially movable from a neutral position in a first direction via a first intermediate position to a first end position, and in a second direction via a second intermediate position to a second end position,
   said coupling member is axially movable with said drive shaft and arranged to be disengaged from said first and second reels when said drive shaft is in said neutral position, to engage said first reel to non-rotatably connect it to said drive shaft when the latter is in said first intermediate and first end positions, and to engage said second reel to non-rotatably connect it to said drive shaft when the latter is in second intermediate and second end positions,
   said first retaining member is arranged to hold said first reel against rotation when said drive shaft is in said neutral and first intermediate position and to be clear of said first reel when said drive shaft is in said first end position, and
   said second retaining member is arranged to hold said second reel against rotation when said drive shaft is in said neutral and second intermediate positions and to be clear of said second reel when said drive shaft is in said second end position.

8. A backrest comprising
   (a) a backrest frame,
   (b) a curved backing insert held in the backrest frame and adjustable to conform to the spine of a person leaning against the backrest, the insert comprising an elastic bow having a first end fixedly supported by the frame, a second end vertically spaced from the first end and an intermediate vertex portion defining a vertex,
   (c) first stressing means connected to the second end and defining a chord of the curved backing insert, the first stressing means being adjustable to move the second end relative to the first end so as to change the curvature of the backing insert, and
   (d) second stressing means connected to the vertex portion and defining a chord of the curved backing insert, the second stressing means being adjustable to move the vertex portion relative to the first and second ends, adjustment of the first and second stressing means maintaining the curved backing insert conformed to the spine of the person leaning thereagainst.

9. A backrest as set forth in claim 8, in which
   said first end is the lower end of said bow,
   said backing insert comprises a housing mounted in said frame and supporting said first end of said bow, said first stressing means comprise a first reel rotatably mounted in said housing, a first tension element connected to said first reel and adapted to be wound on and unwound from said reel, and a first self-locking drive unit operable to rotate said first reel, said second stressing means comprise a second reel rotatably mounted in said housing, a second tension element connected to said second reel and adapted to be wound on and unwound from said reel, and a second self-locking drive unit operable to rotate said second reel, and each of said first and second drive units comprises a reversible electric motor, a transmission operatively connecting said electric motor to the associated reel, and means for automatically de-energizing said electric motor in predetermined positions of the associated tension element.

10. A backrest as set forth in claim 9, in which each of said transmissions comprises a worm gear train having a worm wheel which is nonrotatably connected to the associated reel and has a segment-shaped slot having closed ends, two stops are secured in said housing and extend into respective ones of said slots, and each of said worm wheels is rotatably in opposite senses until respective ends of said cam slot engage the associated stop.

11. A backrest as set forth in claim 8, in which said backing insert is resiliently held in said backrest frame.

12. A backrest as set forth in claim 8, in which said first end of said bow is the top end thereof, said insert comprises a carrier, said bow is guided up and down on said carrier, a first adjusting rod is mounted in said frame and movable in a substantially horizontal direction, said first stressing means comprise a first adjusting rod, which is mounted in said frame and movable in a substantially horizontal direction, and a first link which is pivoted at respective ends to said first adjusting rod and to said bow, and said second stressing means comprise a second adjusting rod, which is mounted in said frame, a stressing member connected to said vertex portion, and a second link which is pivoted at respective ends to said second adjusting rod and said stressing member.

13. A backrest as set forth in claim 12, in which each of said first and second stressing means comprise a screw and nut for axially moving the associated one of said adjusting rods.

* * * * *